(12) United States Patent
Simcox et al.

(10) Patent No.: US 9,343,947 B2
(45) Date of Patent: May 17, 2016

(54) ELECTROMAGNETIC RECIPROCATING ENGINE

(71) Applicant: Fuelless Technologies, LLC, Mooresville, NC (US)

(72) Inventors: Robert L. Simcox, Mount Ulla, NC (US); Kevin Scott Atwell, Mooresville, NC (US)

(73) Assignee: Fuelless Technologies, LLC, Mooresville, NC (US)

( * ) Notice: Subject to any disclaimer, the term of this patent is extended or adjusted under 35 U.S.C. 154(b) by 406 days.

(21) Appl. No.: 14/050,837

(22) Filed: Oct. 10, 2013

(65) Prior Publication Data

US 2014/0097708 A1    Apr. 10, 2014

Related U.S. Application Data

(60) Provisional application No. 61/712,037, filed on Oct. 10, 2012.

(51) Int. Cl.
| | |
|---|---|
| *H02K 7/06* | (2006.01) |
| *H02K 35/02* | (2006.01) |
| *H02K 7/075* | (2006.01) |
| *H02K 33/02* | (2006.01) |
| *H02K 33/16* | (2006.01) |

(52) U.S. Cl.
CPC .............. *H02K 35/02* (2013.01); *H02K 7/075* (2013.01); *H02K 33/02* (2013.01); *H02K 33/16* (2013.01)

(58) Field of Classification Search
CPC ........ H02K 35/02; H02K 33/16; H02K 7/075
USPC ......... 310/15, 23–24, 33–35, 37, 12.14, 68 B
See application file for complete search history.

(56) References Cited

U.S. PATENT DOCUMENTS

| | | | |
|---|---|---|---|
| 3,935,487 A | 1/1976 | Czerniak | |
| 3,949,249 A | 4/1976 | Wisely et al. | |
| 4,317,058 A * | 2/1982 | Blalock ................. | H02K 7/065 310/24 |
| 5,219,034 A | 6/1993 | Wortham | |
| 5,448,116 A | 9/1995 | Weiss et al. | |
| 5,457,349 A * | 10/1995 | Gifford ................. | H02K 7/065 310/24 |
| 5,886,442 A | 3/1999 | Ogino et al. | |
| 6,049,146 A * | 4/2000 | Takara .................... | F03G 7/00 310/23 |
| 6,278,204 B1 * | 8/2001 | Frenette ................. | H02K 7/075 310/24 |
| 7,105,958 B1 | 9/2006 | Elmaleh | |
| 7,667,356 B2 | 2/2010 | Togare | |
| 8,232,690 B2 | 7/2012 | Overstreet | |
| 2012/0007449 A1 * | 1/2012 | Gosvener ............... | H02K 7/075 310/23 |

* cited by examiner

*Primary Examiner* — Thanh Lam
(74) *Attorney, Agent, or Firm* — Additon, Higgins & Pendleton, P.A.

(57) ABSTRACT

The invention relates to an electromagnetic reciprocating engine capable of efficiently converting electrical energy into mechanical energy. The electromagnetic reciprocating engine employs the repelling force generated by electromagnets and permanent magnets to achieve a reciprocating linear motion, which motion is converted to rotational power by a crankshaft.

20 Claims, 4 Drawing Sheets

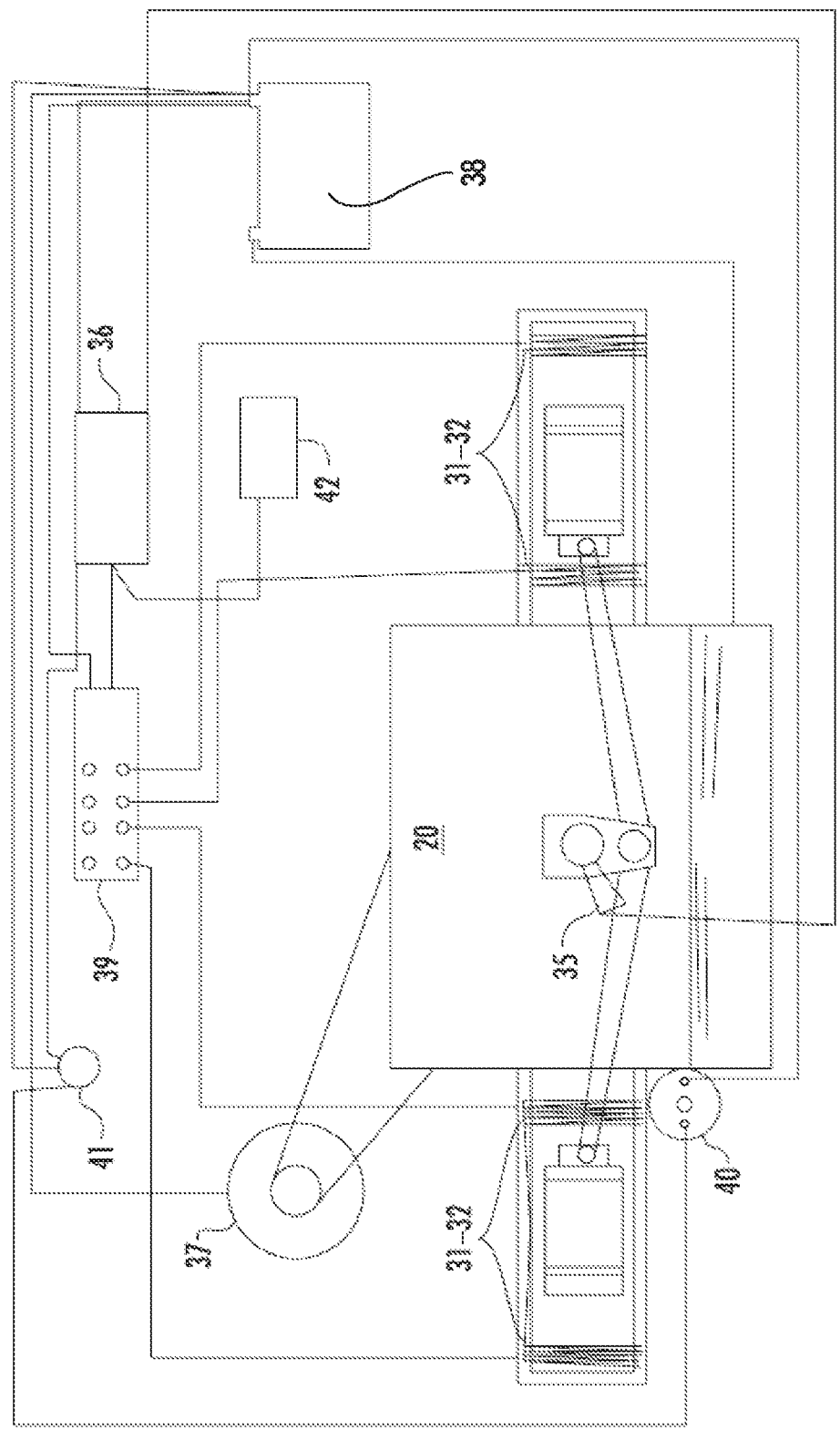

ELECTROMAGNETIC RECIPROCATING ENGINE

CROSS-REFERENCES TO RELATED APPLICATIONS

This application claims the benefit of U.S. Provisional Patent Application No. 61/712,037, filed Oct. 10, 2012, by Simcox et al., entitled Electromagnetic Reciprocating Engine, which is hereby incorporated by reference in its entirety.

FIELD OF THE INVENTION

The disclosure relates generally to engines, and, more specifically, to an electromagnetic reciprocating engine.

BACKGROUND OF THE INVENTION

Machines and vehicles powered by engines help drive economic and societal development. The overwhelming majority of these engines are powered by fossil fuels. An increasing awareness of the environmental impact of burning fossil fuels combined with the increasing cost of such fuels has lead to greater desire for alternative power sources. For example, much investment and research has been put into the development of electric battery cars or solar-powered equipment. To date, the practical and commercial success of these innovative attempts has been lacking. Attempts have been made in the past to harness the power of electromagnetism to power machines and vehicles, but these attempts have generally fallen short as well, largely due to an inability to generate sufficient power.

What is needed is an engine capable of converting electrical energy to mechanical energy through the use of electromagnets. In particular, a need exists for an electromagnetic reciprocating engine capable of supplying ample mechanical power, especially one that can benefit from the use of rare earth magnets, which have become increasingly affordable and available.

SUMMARY OF THE INVENTION

Accordingly, in one aspect, the present invention embraces an electromagnetic reciprocating engine. The electromagnetic reciprocating engine includes a non-ferromagnetic housing. The electromagnetic reciprocating engine also includes a non-ferromagnetic cylinder having a top portion and a bottom portion. The non-ferromagnetic cylinder is disposed within said housing. The electromagnetic reciprocating engine also includes a permanent magnet piston slidably disposed inside said non-ferromagnetic cylinder. The permanent magnet piston has a top pole and a bottom pole. The permanent magnet piston's top pole has an opposite magnetic polarity from its bottom pole. The electromagnetic reciprocating engine also includes an outer electromagnet having a top pole and a bottom pole. The outer electromagnet is positioned substantially adjacent to the non-ferromagnetic cylinder's top portion. The electromagnetic reciprocating engine also includes an inner electromagnet having a top pole and a bottom pole. The inner electromagnet is positioned substantially adjacent to the non-ferromagnetic cylinder's bottom portion. The electromagnetic reciprocating engine also includes a non-ferromagnetic crankshaft disposed within the non-ferromagnetic housing. The electromagnetic reciprocating engine also includes a non-ferromagnetic connecting rod. The non-ferromagnetic connecting rod has a first end connected to the permanent magnet piston and a second end connected to the non-ferromagnetic crankshaft. The electromagnetic reciprocating engine also includes a position sensor positioned substantially adjacent to the non-ferromagnetic crankshaft. The position sensor determines the rotational position of the non-ferromagnetic crankshaft. The electromagnetic reciprocating engine also includes a control unit communicatively connected to the position sensor and electrically connected to the outer electromagnet and the inner electromagnet. The electromagnetic reciprocating engine also includes an electrical source electrically connected to the control unit.

In an alternative embodiment, when the permanent magnet piston is in the top dead center (TDC) position, the top pole of the permanent magnet piston is substantially on the plane that laterally bisects the midpoint between the outer electromagnet's top pole and the outer electromagnet's bottom pole.

In another alternative embodiment, the control unit is configured to energize the outer electromagnet, thereby causing the outer electromagnet's bottom pole to have the same magnetic polarity as the permanent magnet piston's top pole, when the permanent magnet piston is between about 5 degrees and 10 degrees (e.g., about 6 degrees) beyond the top dead center (TDC) position.

In yet another alternative embodiment, the control unit is configured to de-energize the outer electromagnet when the permanent magnet piston is between about 80 degrees and 90 degrees (e.g., about 85 degrees) beyond the top dead center (TDC) position.

In yet another alternative embodiment, when the permanent magnet piston is in the bottom dead center (BDC) position, the bottom pole of the permanent magnet piston is substantially on the plane that laterally bisects the midpoint between the inner electromagnet's top pole and the inner electromagnet's bottom pole.

In yet another alternative embodiment, the control unit is configured to energize the inner electromagnet, thereby causing the inner electromagnet's top pole to have the same magnetic polarity as said permanent magnet piston's bottom pole, when the permanent magnet piston is between 185 degrees and 195 degrees (e.g., about 186 degrees) beyond the top dead center (TDC) position.

In yet another alternative embodiment, the control unit is configured to de-energize the inner electromagnet when the permanent magnet piston is between about 260 degrees and 270 degrees (e.g., about 265 degrees) beyond the top dead center (TDC) position.

In yet another alternative embodiment, the control unit is configured to energize the outer electromagnet, thereby causing the outer electromagnet's bottom pole to have the same magnetic polarity as the permanent magnet piston's top pole, from the time when the permanent magnet piston is between about 5 degrees and 10 degrees (e.g., about 6 degrees) beyond the top dead center (TDC) position to the time when the permanent magnet piston is between about 80 degrees and 90 degrees (e.g., about 85 degrees) beyond the top dead center (TDC) position. The control unit is further configured to energize the inner electromagnet, thereby causing the inner electromagnet's top pole to have the same magnetic polarity as the permanent magnet piston's bottom pole, from when the permanent magnet piston is about 185 degrees and 195 degrees (e.g., about 186 degrees) beyond the top dead center (TDC) position until the permanent magnet piston is between about 260 degrees and 270 degrees (e.g., about 265 degrees) beyond the top dead center (TDC) position.

In yet another alternative embodiment, the control unit is configured to substantially simultaneously (i) energize the outer electromagnet in a manner that causes the outer electromagnet's bottom pole to have the same magnetic polarity as the permanent magnet piston's top pole, and (ii) energize the inner electromagnet in a manner that causes the inner electromagnet's top pole to have the opposite magnetic polarity as the permanent magnet piston's bottom pole, when the permanent magnet piston is between 5 degrees and 10 degrees (e.g., about 6 degrees) beyond the top dead center (TDC) position. The control unit is further configured to substantially simultaneously (i) energize the inner electromagnet in a manner that causes the inner electromagnet's top pole to have the same magnetic polarity as the permanent magnet piston's bottom pole, and (ii) energize the outer electromagnet in a manner that causes the outer electromagnet's bottom pole to have the opposite magnetic polarity as the permanent magnet piston's top pole, when the permanent magnet piston is between 185 degrees and 195 degrees (e.g., about 186 degrees) beyond the top dead center (TDC) position.

In yet another alternative embodiment, the permanent magnet piston includes a rare earth magnet.

In yet another alternative embodiment, the permanent magnet piston includes neodymium.

In yet another alternative embodiment, the permanent magnet piston includes samarium and cobalt.

In yet another alternative embodiment, the permanent magnet piston includes neodymium, samarium and cobalt.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 6 is a schematic diagram of an exemplary electromagnetic reciprocating engine according to the present invention.

DETAILED DESCRIPTION

The disclosure embraces an electromagnetic reciprocating engine. In one aspect, the invention embraces an electromagnetic engine adapted to convert electrical energy into mechanical energy. In some respects, the electromagnetic reciprocating engine according to the present invention resembles a traditional combustion reciprocating engine in that the present electromagnetic reciprocating engine has at least one piston configured to oscillate within a cylinder. As with a traditional combustion reciprocating engine, the oscillating motion of the present electromagnetic reciprocating engine's piston is converted to rotary motion via a crankshaft, which is connected to the piston by a connecting rod. These features will be quite familiar to a person of ordinary skill in the art.

Unlike a traditional combustion reciprocating engine, however, the electromagnetic reciprocating engine according to the present disclosure does not force the piston to move using pressurized gases that result from the explosion of combustable fuel. Instead, the electromagnetic reciprocating engine according to the present invention relies upon the electromagnetic force to oscillate the piston within the cylinder.

The electromagnetic reciprocating engine according to the present invention employs a permanent magnet piston. The permanent magnet piston is positioned inside a cylinder in a fashion similar to a conventional reciprocating engine. So that the permanent magnet piston may freely move within the cylinder, the cylinder is constructed of non-ferromagnetic material(s). Similarly, the crankshaft, and the connecting rod that connects the crankshaft to the permanent magnet piston, are constructed of non-ferromagnetic material(s) so that neither their movement nor the movement of the permanent magnet piston are adversely affected by magnetic forces. An electromagnet is placed at the top portion of the non-ferromagnetic cylinder, and another electromagnet is placed at the bottom portion of the non-ferromagnetic cylinder. Powered by an electrical source such as a battery, and controlled by a control unit, the electromagnets work in tandem to drive the permanent magnet piston in a reciprocating motion within the non-ferromagnetic cylinder. More specifically, the electromagnet at the top portion of the non-ferromagnetic cylinder generates a magnetic force that repels the permanent magnet piston toward the bottom portion of the non-ferromagnetic cylinder. Conversely, the electromagnet at the bottom portion of the non-ferromagnetic cylinder generates a magnetic force that repels the permanent magnet piston toward the top portion of the non-ferromagnetic cylinder. By cycling the repelling forces from these electromagnets, the electromagnetic reciprocating engine according to the present invention achieves the continuous reciprocating motion of the permanent magnet piston necessary to turn the crankshaft, thereby producing rotational mechanical motion.

Figure 1:
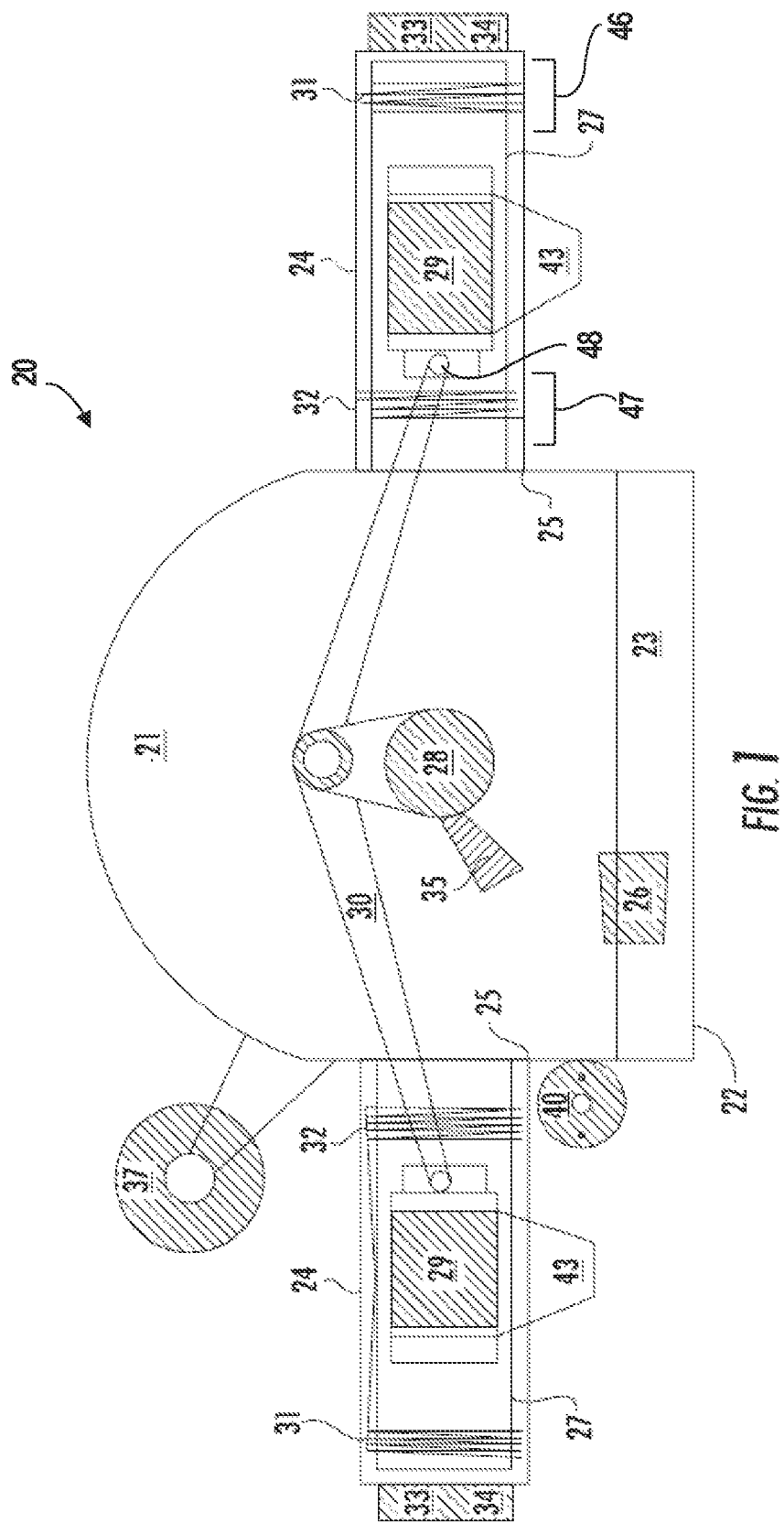
FIG. 1 is a front cross-section view of an exemplary electromagnetic reciprocating engine according to the present invention.
Figure 2:
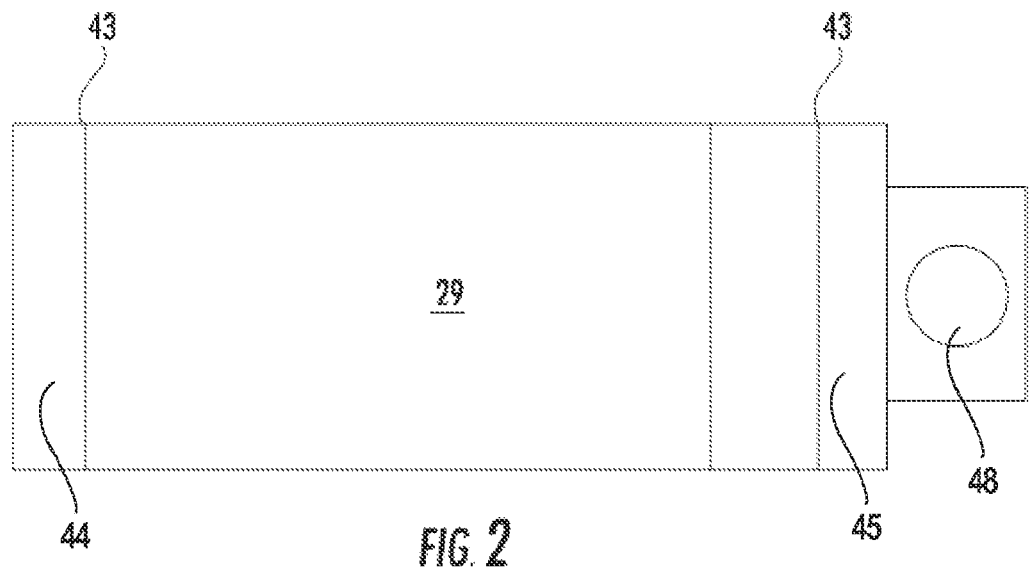
FIG. 2 is a side elevation view of an exemplary permanent magnet piston according to the present invention.

Referring now to FIGS. 1, 2, and 6, the electromagnetic reciprocating engine 20 according to the present invention includes a non-ferromagnetic housing assembly 21 (e.g., engine casing, engine block, etc.). The non-ferromagnetic housing assembly 21 physically integrates the components of the electromagnetic reciprocating engine 20. Disposed within the non-ferromagnetic housing assembly 21 is a non-ferromagnetic crankshaft 28. Typically, the non-ferromagnetic crankshaft 28 is positioned substantially along the central longitudinal axis of the housing assembly The non-ferromagnetic crankshaft 28 converts the reciprocating kinetic energy created by the electromagnetic reciprocating engine 20 to rotational kinetic energy as will be appreciated by a person of ordinary skill in the art.

References in this application to "top" or "outside" and "bottom" or "inside" are relative to the location of the non-ferromagnetic crankshaft 28. Specifically, the term "top" is intended to mean that portion, area, or location that is farthest from the crankshaft; and "bottom" is intended to mean that portion, area, or location that is nearest to the non-ferromagnetic crankshaft 28. In the same way, an "outer" positioning is intended to refer to a position that is farther away from the non-ferromagnetic crankshaft 29 than an "inner" positioning.

The electromagnetic reciprocating engine 20 according to the present invention also includes a non-ferromagnetic cylinder 27. The non-ferromagnetic cylinder 27 has a top portion 46 and a bottom portion 47. The non-ferromagnetic cylinder 27, as with the other non-ferromagnetic components disclosed herein, may be constructed of any non-ferromagnetic material(s) of suitable strength and durability (e.g., aluminum, plastic, etc.). The non-ferromagnetic cylinder 27 may have an outer liner 24 for containing a liquid for cooling the non-ferromagnetic cylinder 27, which may become heated from frictional forces experienced during operation of the electromagnetic reciprocating engine 20. The cooling liquid may be a lubricant 23 (e.g., motor oil), which may also be used to lubricate the moving parts of the electromagnetic reciprocating engine 20.

The electromagnetic reciprocating engine 20 includes a permanent magnet piston 29. The permanent magnet piston 29 is slidably disposed inside the non-ferromagnetic cylinder 27. In other words, the permanent magnet piston 29 is positioned inside the non-ferromagnetic cylinder 27 in such a configuration that the permanent magnet piston 29 can slide along the longitudinal axis of the non-ferromagnetic cylinder 27. The permanent magnet piston 29 is designed so that it can oscillate back-and-forth (i.e., in a reciprocating manner) inside the non-ferromagnetic cylinder 27 and along the longitudinal axis of the non-ferromagnetic cylinder 27. To facilitate the smooth reciprocating motion of the permanent magnet piston 29 (i.e., to facilitate its substantially linear motion), the permanent magnet piston 29 is typically sized and shaped so that it fits slidably but securely within the non-ferromagnetic cylinder 27. By ensuring that the permanent magnet piston 29 moves in a substantially linear path, the power transferred by the moving permanent magnet piston 29 is maximized, and mechanical vibrations that can increase wear and noise are minimized. The permanent magnet piston 29 may be any type of piston generally suitable for use in a reciprocating engine, including trunk pistons, crosshead pistons, deflector pistons, and slipper pistons.

While it is desirable for the permanent magnet piston 29 to fit securely inside the non-ferromagnetic cylinder 27, it should be noted that there is no need to maintain a perfect seal between the sides of the permanent magnet piston 29 and the interior of the non-ferromagnetic cylinder 27. Unlike combustion engines, which require such a seal for the creation of a combustion chamber capable of containing pressurized gases, the electromagnetic reciprocating engine 20 according to the present invention does not employ a combustion chamber technique, and therefore does not require that there be a strong seal between the permanent magnet piston 29 and the interior of the non-ferromagnetic cylinder 27. The permanent magnet piston 29 nevertheless typically has a wear ring 43 positioned circumferentially around the permanent magnet piston 29. The wear ring 43 serves to secure the permanent magnet piston 29 within non-ferromagnetic cylinder 27 and to facilitate the distribution of lubricant 23 inside the non-ferromagnetic cylinder 27, and also reduces wear on the permanent magnet piston 29 by preventing or reducing contact between the sides of the permanent magnet piston 29 and the interior of the non-ferromagnetic cylinder 27. In this way, the wear ring 43 prolongs the usable life of the permanent magnet piston 29 and simplifies maintenance (e.g., by allowing for the replacement of a relatively inexpensive wear ring 43 instead of a more expensive and time consuming replacement of a worn permanent magnet piston 29).

The permanent magnet piston 29 has a top pole 44 (e.g., magnetic pole) and a bottom pole 45. Typically, the top pole includes at least a portion of the piston head. Because the permanent magnet piston 29 is a magnet, the top pole 44 of the permanent magnet piston 29 has an opposite magnetic polarity from the bottom pole 45 of the permanent magnet piston 29. The permanent magnet piston 29 may be constructed of any material or process that results in the permanent magnet piston 29 being a magnet. Typically, the permanent magnet piston 29 includes a rare earth element(s) such that the permanent magnet piston 29 is a rare earth magnet. The incorporation of rare earth elements, including neodymium, samarium and/or cobalt, into the permanent magnet piston 29 creates a sufficiently strong magnetic field around the permanent magnet piston 29 to achieve sufficiently powerful electromagnetic forces (e.g., repelling forces). The permanent magnet piston 29 is typically constructed from an alloy containing neodymium or containing samarium and cobalt.

The electromagnetic reciprocating engine 20 according to the present invention also includes an outer electromagnet 31 positioned substantially adjacent to the top portion 46 of the non-ferromagnetic cylinder 27. The outer electromagnet 31 has a top pole and a bottom pole. It will be appreciated by a person of ordinary skill in the art that for an electromagnet to be magnetized, and thus for it to have magnetic poles, an electric current must be applied. References to the poles (e.g., magnetic poles) of electromagnets are intended to refer to the magnetic poles that result from the magnetization of the electromagnet when an electric current is applied. It will be further appreciated by a person of ordinary skill in the art that, unlike a permanent magnet, the magnetic field of an electromagnet can be controlled by the amount of electricity supplied to the electromagnet (e.g., the greater the electric current, the greater the magnetic force). The outer electromagnet is typically positioned within a few centimeters (e.g., about 2 centimeters) of the non-ferromagnetic cylinder's top portion 46. More typically, the outer electromagnet is a wire coil substantially circumferentially attached around the non-ferromagnetic cylinder's top portion 46. The outer electromagnet's bottom pole is the same polarity as the permanent magnet piston's top pole 44.

The electromagnetic reciprocating engine 20 is configured such that when the permanent magnet piston 29 is in the top dead center (TDC) position, the top pole 44 of the permanent magnet piston 29 is substantially on the plane that laterally bisects the midpoint between the outer electromagnet's top pole and the outer electromagnet's bottom pole. In other words, when the permanent magnet piston 29 is in the top dead center (TDC) position, the outermost portion of the permanent magnet piston 29 is substantially positioned along the same plane as the plane of demarcation between the outer electromagnet's top pole and bottom pole.

The electromagnetic reciprocating engine 20 according to the present invention also includes an inner electromagnet 32 positioned substantially adjacent to the bottom portion 47 of the non-ferromagnetic cylinder 27. The inner electromagnet 32 has a top pole and a bottom pole. The inner electromagnet 32 is typically positioned within a few centimeters (e.g., about 2 centimeters) of the non-ferromagnetic cylinder's bottom portion 47. More typically, the inner electromagnet 32 is a wire coil substantially circumferentially attached around the non-ferromagnetic cylinder's bottom portion 47. The inner electromagnet's top pole is the same polarity as the permanent magnet piston's bottom pole 45.

The electromagnetic reciprocating engine 20 is configured such that when the permanent magnet piston 29 is in the bottom dead center (BDC) position, the bottom pole 45 of the permanent magnet piston 29 is substantially on the plane that laterally bisects the midpoint between the inner electromagnet's top pole and the inner electromagnet's bottom pole. In other words, when the permanent magnet piston 29 is in the bottom dead center (BDC) position, the innermost portion (e.g., innermost magnetic portion) of the permanent magnet piston 29 is substantially positioned along the same plane as the plane of demarcation between the inner electromagnet's top pole and bottom pole.

The permanent magnet piston 29 is movably attached to the non-ferromagnetic crankshaft 28 by a connecting rod 30. The connecting rod 30 has a first end connected to the permanent magnet piston 29 and a second end connected to the non-ferromagnetic crankshaft 28. It will be appreciated by a person of ordinary skill in the art that the connecting rod 30 may be a unitary member, or it may be an assembly of two or more component parts (e.g., piston rod and crosshead). Typically, the connecting rod 30 is a single elongated member. Typically, the connecting rod 30 is connected to the permanent magnet piston 29 by a wrist pin 48.

A position sensor 35 (e.g., a crank position sensor) is disposed substantially adjacent to the non-ferromagnetic crankshaft 28. The position sensor 35 is adapted to monitor the rotational position of the non-ferromagnetic crankshaft 28. A suitable position sensor would be one of the various types that are presently used in internal combustion engines, which types are well known in the art.

A control unit 36 is communicatively connected to the position sensor 35 such that the control unit 36 can receive information regarding the rotational position of the non-ferromagnetic crankshaft 28. The control unit 36 is further electrically connected to the outer electromagnet 31 and inner electromagnet 32. The control unit 36 is electrically connected to an electrical source 38, such as a battery, which provides the electricity required to power the outer electromagnet 31 and the inner electromagnet 32.

The control unit 36 is adapted to energize the outer electromagnet 31 beginning when the permanent magnet piston 29 is between about 5 degrees and 10 degrees (e.g., about 6 degrees) beyond top dead center, and to de-energize the outer electromagnet 31 when the permanent magnet piston 29 is between about 80 degrees and 90 degrees (e.g., about 85 degrees) beyond top dead center. The control unit 36 is further adapted to energize the inner electromagnet 32 beginning when the permanent magnet piston 29 is between about 185 degrees and 195 degrees (e.g., about 186 degrees) beyond top dead center, and to de-energize the inner electromagnet 32 when the permanent magnet piston 29 is between about 260 degrees and 270 degrees (e.g., about 265 degrees) beyond top dead center.

Figure 3:
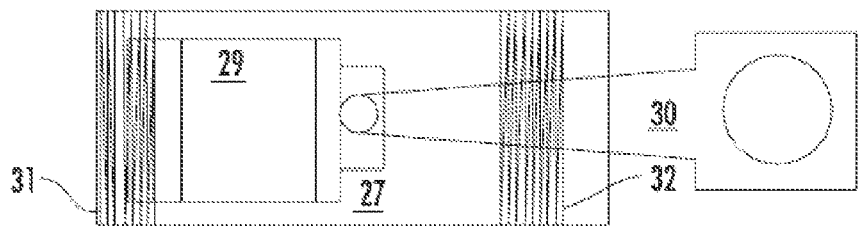
FIG. 3 is a front cross-section view of an exemplary non-ferromagnetic cylinder and an exemplary permanent magnet piston according to the present invention, wherein the permanent magnet piston is positioned in the top dead center position.
Figure 4:
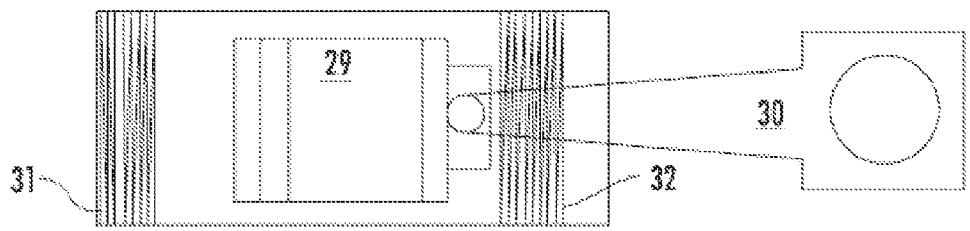
FIG. 4 is a front cross-section view of an exemplary non-ferromagnetic cylinder and an exemplary permanent magnet piston according to the present invention, wherein the permanent magnet piston is positioned at a point between the top dead center position and the bottom dead center position.
Figure 5:
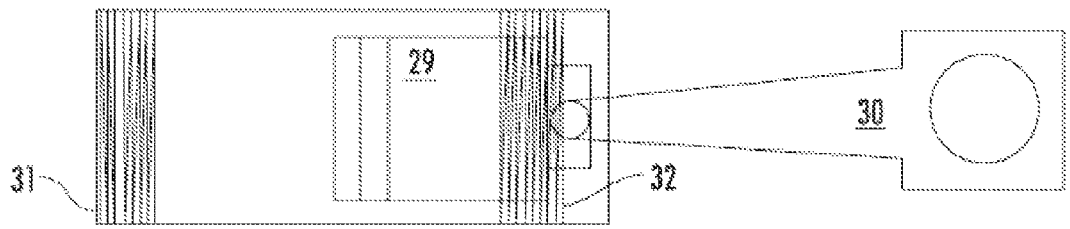
FIG. 5 is a front cross-section view of an exemplary non-ferromagnetic cylinder and an exemplary permanent magnet piston according to the present invention, wherein the permanent magnet piston is positioned in the bottom dead center position.

Turning now to FIGS. 3 through 5, each figure depicts a cross-sectional view of the positioning of a permanent magnet piston 29 within a non-ferromagnetic cylinder 27 at three distinct moments in the motive process. FIG. 3 depicts a permanent magnet piston 29 in a position where it is between about 5 degrees and 10 degrees (e.g., about 6 degrees) beyond top dead center. When the position sensor 35 communicates this position to the control unit 36, the control unit 36 energizes the outer electromagnet 31. The outer electromagnet 31 is configured to generate a magnetic field at its bottom pole of opposite polarity from the permanent magnet piston's top pole 44. Consequently, when the outer electromagnet 31 is energized and, thereby, magnetized, its opposing magnetic polarity repels the top pole 44. This repelling force causes the permanent magnet piston 29 to move in a rapid fashion longitudinally toward the bottom portion 47 of the non-ferromagnetic cylinder 27. The outer electromagnet 31 continues to exert a repelling magnetic force on the permanent magnet piston 29 until the control unit 36 de-energizes the outer electromagnet 31 when the permanent magnet piston 29 is between about 80 degrees and about 90 degrees (e.g., about 85 degrees) beyond top dead center. FIG. 4 depicts the permanent magnet piston 29 at approximately the midpoint of its linear movement toward the bottom portion 47 of the non-ferromagnetic cylinder 27.

FIG. 5 depicts a permanent magnet piston 29 in a position where it is between about 185 degrees and about 195 degrees (e.g., about 186 degrees) beyond top dead center. When the position sensor 35 communicates this position to the control unit 36, the control unit 36 energizes the inner electromagnet 32. The inner electromagnet 32 is configured to generate a magnetic field at its top pole of opposite polarity from the permanent magnet piston's 29 bottom pole 45. Consequently, when the inner electromagnet 32 is energized and, thereby, magnetized, its opposing magnetic polarity repels the bottom pole 45. This repelling force causes the permanent magnet piston 29 to move in a rapid fashion longitudinally toward the top portion 48 of the non-ferromagnetic cylinder 27. The inner electromagnet 32 continues to exert a repelling magnetic force on the permanent magnet piston 29 until the control unit 36 de-energizes the inner electromagnet 32 when the permanent magnet piston 29 is between about 260 degrees and about 270 degrees (e.g., about 265 degrees) beyond top dead center.

In an alternative embodiment, the electromagnetic reciprocating engine 20 according to the present invention utilizes both a repelling electromagnetic force (e.g., electromagnetic push) and an attracting electromagnetic force (e.g., electromagnetic pull). This alternative embodiment relies on the repelling force created by like magnetic poles to repel (e.g., push) the permanent magnet piston 29 longitudinally through the non-ferromagnetic cylinder 27; and it also relies on the attractive force created by opposite magnetic poles to attract (e.g., draw, drag, pull) the permanent magnet piston 29 longitudinally through the non-ferromagnetic cylinder 27. In this alternative embodiment of the electromagnetic reciprocating engine 20 according to the present invention, the control unit is configured to substantially simultaneously (i) energize the outer electromagnet in a manner that causes the outer electromagnet's bottom pole to have the same magnetic polarity as the permanent magnet piston's top pole, and (ii) energize the inner electromagnet in a manner that causes the inner electromagnet's top pole to have the opposite magnetic polarity as the permanent magnet piston's bottom pole, when the permanent magnet piston is between 5 degrees and 10 degrees (e.g., about 6 degrees) beyond the top dead center (TDC) position. The control unit is further configured to substantially simultaneously (i) energize the inner electromagnet in a manner that causes the inner electromagnet's top pole to have the same magnetic polarity as the permanent magnet piston's bottom pole, and (ii) energize the outer electromagnet in a manner that causes the outer electromagnet's bottom pole to have the opposite magnetic polarity as the permanent magnet piston's top pole, when the permanent magnet piston is between 185 degrees and 195 degrees (e.g., about 186 degrees) beyond the top dead center (TDC) position. It will be appreciated by a person of ordinary skill in the art that the term "substantially simultaneously" means, in this context, that the events occur at the same time or within a few milliseconds (e.g. 200 milliseconds) of each other.

Through the control unit's 36 precisely timed transfer of electrical current in an alternating manner to either the outer electromagnet 31 or the inner electromagnet 32, the permanent magnet piston 29 is moved linearly back and forth in a reciprocating fashion in virtually the same motion as a piston in a conventional internal combustion engine. The reciprocating motion of the permanent magnet piston 29 pushes and pulls on the connected non-ferromagnetic connecting rod 30, thereby turning the non-ferromagnetic crankshaft 28.

Returning now to FIGS. 1 and 6, in a preferred embodiment of the electromagnetic reciprocating engine 20 according to the present invention, the top portion 46 of each non-ferromagnetic cylinder 27 defines an opening comprising an air vent 33 having an air filter 34. The air vent 33 allows for air to escape the non-ferromagnetic cylinder 27, thereby preventing the buildup of air pressure that could impede the movement of the permanent magnet piston 29 or otherwise damage the non-ferromagnetic cylinder 27. In a preferred embodiment, the movement of the permanent magnet piston 29, the non-ferromagnetic connecting rod 30, and the non-ferromagnetic crankshaft 28 is facilitated by lubricant 23 (e.g., motor oil) contained in the housing assembly 21. Gravity causes the lubricant 23 to collect in the oil sump 22. An oil pump 26 is attached to the housing assembly 21. The oil pump 26 collects the lubricant 23 from the oil sump 22 and distributes it throughout the housing assembly 21, including to the non-ferromagnetic cylinder 27. An oil drain 25 allows for lubricant 23 to drain from the cylinder assembly. As discussed, in one embodiment, the non-ferromagnetic cylinder 27 is substantially encased by an outer liner 24. The non-ferromagnetic cylinder 27 and the outer liner 24 define a gap through which lubricant 23 is circulated by the oil pump 26, thereby cooling the non-ferromagnetic cylinder 27 and the outer electromagnet 31 and inner electromagnet 32.

Finally referring to FIG. 6, in an alternative embodiment, the electromagnetic reciprocating engine employs a direct current system to start the electromagnetic reciprocating engine 20. A starter switch 41 (i.e., a key switch), when activated, closes the circuit between the electrical source 38 and a starter 40, which is electrically connected to the electrical source via the starter switch 41. The starter 40 is substantially adjacent to the non-ferromagnetic crankshaft 28. When energized, the starter 40 rotates the crankshaft 28 until the position sensor 35 causes the control unit 36 to energize either the inner electromagnet 32 or outer electromagnet 31, thereby initiating the continuous reciprocating action of the permanent magnet piston 29.

In an alternative embodiment, the control unit 36 comprises a switch box 39 to facilitate the timed distribution of electric current from the electrical source 38 to the outer electromagnet 31 and the inner electromagnet 32. In addition, the control unit 36 may also comprise a variable speed control switch 42 to vary the electric current passing to the outer electromagnet 31 and the inner electromagnet 32, thereby controlling the revolutions per minute (RPMs) of the non-ferromagnetic crankshaft 28. An alternator 37 may be connected to the non-ferromagnetic crankshaft 28 and electrically connected to the electrical source 38 for purposes of recharging the electrical source 38.

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. An electromagnetic reciprocating engine comprising:
a non-ferromagnetic housing;
a non-ferromagnetic cylinder having a top portion and a bottom portion, said non-ferromagnetic cylinder being disposed within said housing;
a permanent magnet piston slidably disposed inside said non-ferromagnetic cylinder, said permanent magnet piston having a top pole and a bottom pole, said top pole having an opposite magnetic polarity from said bottom pole;
an outer electromagnet having a top pole and a bottom pole, said outer electromagnet positioned substantially adjacent to the top portion of said non-ferromagnetic cylinder;
an inner electromagnet having a top pole and a bottom pole, said inner electromagnet positioned substantially adjacent to the bottom portion of said non-ferromagnetic cylinder;
a non-ferromagnetic crankshaft disposed within said non-ferromagnetic housing;
a non-ferromagnetic connecting rod having a first end connected to said permanent magnet piston and a second end connected to said non-ferromagnetic crankshaft;
a position sensor positioned substantially adjacent to said non-ferromagnetic crankshaft for determining the rotational position of the non-ferromagnetic crankshaft;
a control unit communicatively connected to said position sensor and electrically connected to said outer electromagnet and said inner electromagnet; and
an electrical source electrically connected to said control unit.

2. The electromagnetic reciprocating engine of claim 1, wherein when said permanent magnet piston is in the top dead center (TDC) position, said top pole of said permanent magnet piston is substantially on the plane that laterally bisects the midpoint between said outer electromagnet's top pole and said outer electromagnet's bottom pole.

3. The electromagnetic reciprocating engine of claim 2, wherein said control unit is configured to energize said outer electromagnet, thereby causing said outer electromagnet's bottom pole to have the same magnetic polarity as said permanent magnet piston's top pole, when said permanent magnet piston is between 5 degrees and 10 degrees beyond the top dead center (TDC) position.

4. The electromagnetic reciprocating engine of claim 3, wherein said control unit is configured to de-energize said outer electromagnet when the permanent magnet piston is between about 80 degrees and 90 degrees beyond the top dead center (TDC) position.

5. The electromagnetic reciprocating engine of claim 1, wherein when said permanent magnet piston is in the bottom dead center (BDC) position, said bottom pole of said permanent magnet piston is substantially on the plane that laterally bisects the midpoint between said inner electromagnet's top pole and said inner electromagnet's bottom pole.

6. The electromagnetic reciprocating engine of claim 5, wherein said control unit is configured to energize said inner electromagnet, thereby causing said inner electromagnet's top pole to have the same magnetic polarity as said permanent magnet piston's bottom pole, when said permanent magnet piston is between 185 degrees and 195 degrees beyond the top dead center (TDC) position.

7. The electromagnetic reciprocating engine of claim 6, wherein said control unit is configured to de-energize said inner electromagnet when said permanent magnet piston is between 260 degrees and 270 degrees beyond the top dead center (TDC) position.

8. The electromagnetic reciprocating engine of claim 1, wherein:
when said permanent magnet piston is in the top dead center (TDC) position, said top pole of said permanent magnet piston is substantially on the plane that laterally bisects the midpoint between said outer electromagnet's top pole and said outer electromagnet's bottom pole; and when said permanent magnet piston is in the bottom dead center (BDC) position, said bottom pole of said permanent magnet piston is substantially on the plane that laterally bisects the midpoint between said inner electromagnet's top pole and said inner electromagnet's bottom pole.

9. The electromagnetic reciprocating engine of claim 8, wherein:
said control unit is configured to energize said outer electromagnet, thereby causing said outer electromagnet's bottom pole to have the same magnetic polarity as said permanent magnet piston's top pole, when said permanent magnet piston is between 5 degrees and 10 degrees beyond the top dead center (TDC) position;
said control unit is configured to de-energize said outer electromagnet when the permanent magnet piston is between about 80 degrees and 90 degrees beyond the top dead center (TDC) position;
said control unit is configured to energize said inner electromagnet, thereby causing said inner electromagnet's top pole to have the same magnetic polarity as said permanent magnet piston's bottom pole, when said permanent magnet piston is between 185 degrees and 195 degrees beyond the top dead center (TDC) position; and
said control unit is configured to de-energize said inner electromagnet when said permanent magnet piston is between 260 degrees and 270 degrees beyond the top dead center (TDC) position.

10. The electromagnetic reciprocating engine of claim 1, wherein said permanent magnet piston comprises a rare earth magnet.

11. The electromagnetic reciprocating engine of claim 1, wherein said permanent magnet piston comprises neodymium.

12. The electromagnetic reciprocating engine of claim 1, wherein said permanent magnet piston comprises samarium and cobalt.

13. The electromagnetic reciprocating engine of claim 1, wherein said permanent magnet piston comprises neodymium, samarium and cobalt.

14. An electromagnetic reciprocating engine comprising:
a non-ferromagnetic housing;
a non-ferromagnetic cylinder having a top portion and a bottom portion, said non-ferromagnetic cylinder being disposed within said housing;
a permanent magnet piston slidably disposed inside said non-ferromagnetic cylinder, said permanent magnet piston having a top pole and a bottom pole, said top pole having an opposite magnetic polarity from said bottom pole;
an outer electromagnet having a top pole and a bottom pole, said outer electromagnet positioned substantially adjacent to the top portion of said non-ferromagnetic cylinder;
an inner electromagnet having a top pole and a bottom pole, said inner electromagnet positioned substantially adjacent to the bottom portion of said non-ferromagnetic cylinder;
a non-ferromagnetic crankshaft disposed within said non-ferromagnetic housing;
a non-ferromagnetic connecting rod having a first end connected to said permanent magnet piston and a second end connected to said non-ferromagnetic crankshaft;
a position sensor disposed substantially adjacent to said non-ferromagnetic crankshaft for determining the rotational position of the non-ferromagnetic crankshaft;
a control unit communicatively connected to said position sensor and electrically connected to said outer electromagnet and said inner electromagnet; and
an electrical source electrically connected to said control unit;
wherein when said permanent magnet piston is in the top dead center (TDC) position, said top pole of said permanent magnet piston is substantially on the plane that laterally bisects the midpoint between said outer electromagnet's top pole and said outer electromagnet's bottom pole;
wherein when said permanent magnet piston is in the bottom dead center (BDC) position, said bottom pole of said permanent magnet piston is substantially on the plane that laterally bisects the midpoint between said inner electromagnet's top pole and said inner electromagnet's bottom pole;
wherein said control unit is configured to substantially simultaneously (i) energize said outer electromagnet in a manner that causes said outer electromagnet's bottom pole to have the same magnetic polarity as said permanent magnet piston's top pole, and (ii) energize said inner electromagnet in a manner that causes said inner electromagnet's top pole to have the opposite magnetic polarity as said permanent magnet piston's bottom pole, when said permanent magnet piston is between 5 degrees and 10 degrees beyond the top dead center (TDC) position; and
wherein said control unit is configured to substantially simultaneously (i) energize said inner electromagnet in a manner that causes said inner electromagnet's top pole to have the same magnetic polarity as said permanent magnet piston's bottom pole, and (ii) energize said outer electromagnet in a manner that causes said outer electromagnet's bottom pole to have the opposite magnetic polarity as said permanent magnet piston's top pole, when said permanent magnet piston is between 185 degrees and 195 degrees beyond the top dead center (TDC) position.

15. A method of operating an electromagnetic reciprocating engine, comprising:
providing an electromagnetic reciprocating engine comprising:
a non-ferromagnetic housing;
a non-ferromagnetic cylinder having a top portion and a bottom portion, said non-ferromagnetic cylinder being disposed within said housing;
a permanent magnet piston slidably disposed inside said non-ferromagnetic cylinder, said permanent magnet piston having a top pole and a bottom pole, said top pole having an opposite magnetic polarity from said bottom pole;
an outer electromagnet having a top pole and a bottom pole, said outer electromagnet positioned substantially adjacent to the top portion of said non-ferromagnetic cylinder;
an inner electromagnetic having a top pole and a bottom pole, said inner electromagnet positioned substantially adjacent to the bottom portion of said non-ferromagnetic cylinder;
a non-ferromagnetic crankshaft disposed within said non-ferromagnetic housing;
a non-ferromagnetic connecting rod having a first end connected to said permanent magnet piston and a second end connected to said non-ferromagnetic crankshaft;

a position sensor positioned substantially adjacent to said non-ferromagnetic crankshaft for determining the rotational position of the non-ferromagnetic crankshaft;

a control unit communicatively connected to said position sensor and electrically connected to said outer electromagnet and said inner electromagnet; and an electrical source electrically connected to said control unit;

wherein when said permanent magnet piston is in the top dead center (TDC) position, said top pole of said permanent magnet piston is substantially on the plane that laterally bisects the midpoint between said outer electromagnet's top pole and said outer electromagnet's bottom pole; and wherein when said permanent magnet piston is in the bottom dead center (BDC) position, said bottom pole of said permanent magnet piston is substantially on the plane that laterally bisects the midpoint between said inner electromagnet's top pole and said inner electromagnet's bottom pole;

energizing said outer electromagnet, thereby causing said outer electromagnet's bottom pole to have the same magnetic polarity as said permanent magnet piston's top pole, when said permanent magnet piston is between 5 degrees and 10 degrees beyond the top dead center (TDC) position;

de-energizing said outer electromagnet when the permanent magnet piston is between about 80 degrees and 90 degrees beyond the top dead center (TDC) position;

energizing said inner electromagnet, thereby causing said inner electromagnet's top pole to have the same magnetic polarity as said permanent magnet piston's bottom pole, when said permanent magnet piston is between 185 degrees and 195 degrees beyond the top dead center (TDC) position; and de-energizing said inner electromagnet when said permanent magnet piston is between 260 degrees and 270 degrees beyond the top dead center (TDC) position.

16. The method of claim 15, comprising:
de-energizing the outer electromagnet when the permanent magnet piston is about 85 degrees beyond the top dead center (TDC) position.

17. The method of claim 15, comprising:
de-energizing the inner electromagnet when the permanent magnet piston is about 265 degrees beyond the top dead center (TDC) position.

18. The method of claim 15, comprising:
de-energizing the outer electromagnet when the permanent magnet piston is 85 degrees beyond the top dead center (TDC) position; and
de-energizing the inner electromagnet when the permanent magnet piston is 265 degrees beyond the top dead center (TDC) position.

19. The method of claim 15, wherein said permanent magnet piston comprises a rare earth magnet.

20. The method of claim 15, wherein said permanent magnet piston comprises neodymium.

* * * * *